(12) United States Patent
Kashima et al.

(10) Patent No.: US 6,507,442 B2
(45) Date of Patent: Jan. 14, 2003

(54) OBJECTIVE LENS

(75) Inventors: Shingo Kashima, Sagamihara (JP); Takehiro Yoshida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/793,566

(22) Filed: Feb. 27, 2001

(65) Prior Publication Data

US 2001/0033425 A1 Oct. 25, 2001

(30) Foreign Application Priority Data

Feb. 29, 2000 (JP) ........................................ 2000-058001
Feb. 20, 2001 (JP) ........................................ 2001-043117

(51) Int. Cl.[7] ............................ G02B 21/02; G02B 9/00
(52) U.S. Cl. .................... 359/656; 359/657; 359/658; 359/740
(58) Field of Search .................. 359/656, 657, 359/658, 649, 740, 756, 757

(56) References Cited

U.S. PATENT DOCUMENTS 5,831,770 A * 11/1998 Matsuzawa et al. ........ 359/649

FOREIGN PATENT DOCUMENTS

| JP | 5-72482 | 3/1993 |
| JP | 6-242381 | 9/1994 |
| JP | 9-243923 | 9/1997 |
| JP | 10-104510 | 4/1998 |
| JP | 10-221597 | 8/1998 |
| JP | 11-167067 | 6/1999 |
| JP | 11-249025 | 9/1999 |

* cited by examiner

Primary Examiner—Georgia Epps
Assistant Examiner—Tim Thompson
(74) Attorney, Agent, or Firm—Pillsbury Winthrop LLP

(57) ABSTRACT

An objective lens includes a first lens unit constructed with a plurality of single lenses, having a negative power as a whole, and a second lens unit constructed with a plurality of single lenses, arranged on the object side of the first lens unit. Each of the first and second lens units is provided with air spaces between positive and negative lenses of different media and has at least one pair of lenses designed to satisfy all the following conditions when the parfocal distance of the objective lens is denoted by L (mm), an air apace by d (mm), the radius of curvature of a lens surface with a positive power opposite to the air space by Rp, and the radius of curvature of a lens surface with a negative power opposite to the air space by Rn, and in addition to the pair of lenses, the second lens unit has at least one single positive biconvex lens and at least one single positive meniscus lens, and thereby it becomes possible to correct chromatic aberration and to favorably obtain resolution corresponding to a high numerical aperture and a wavelength used:

$0.01 < d$ $d/L < 0.01$ $0.88 < Rp/Rn < 1.14$.

7 Claims, 8 Drawing Sheets

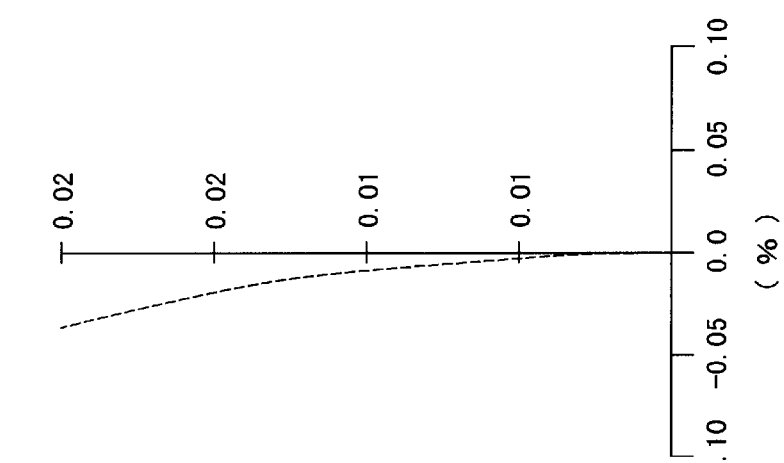
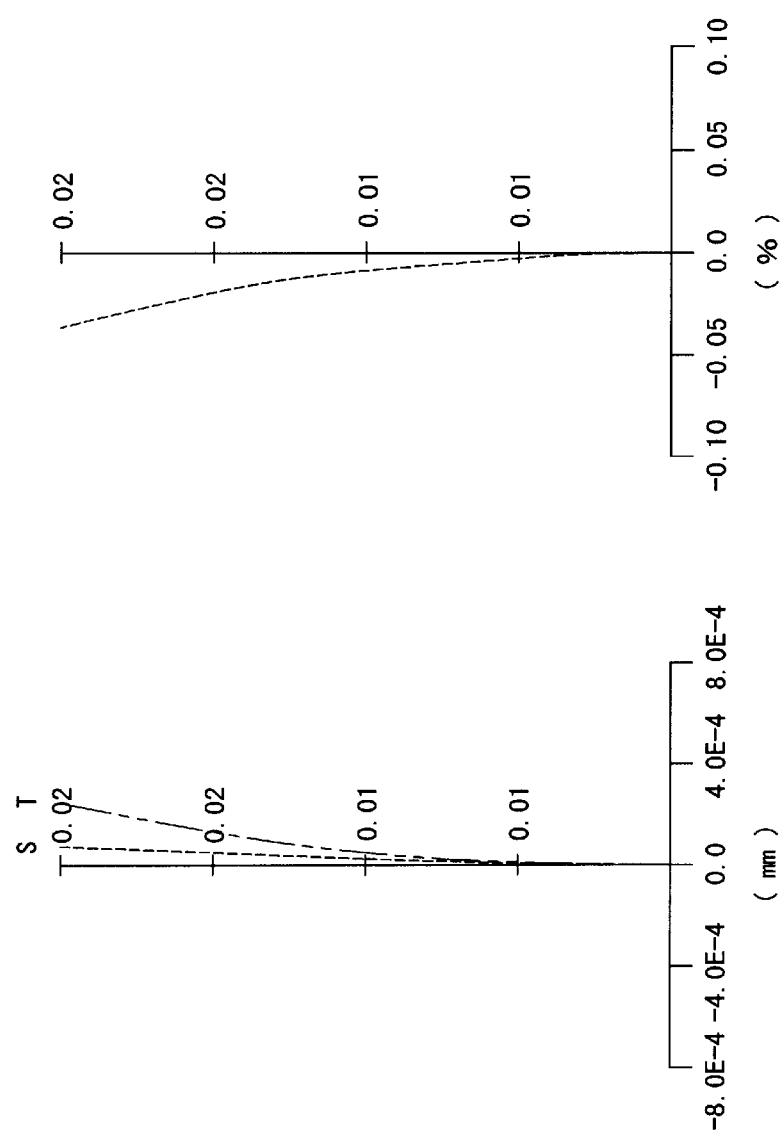

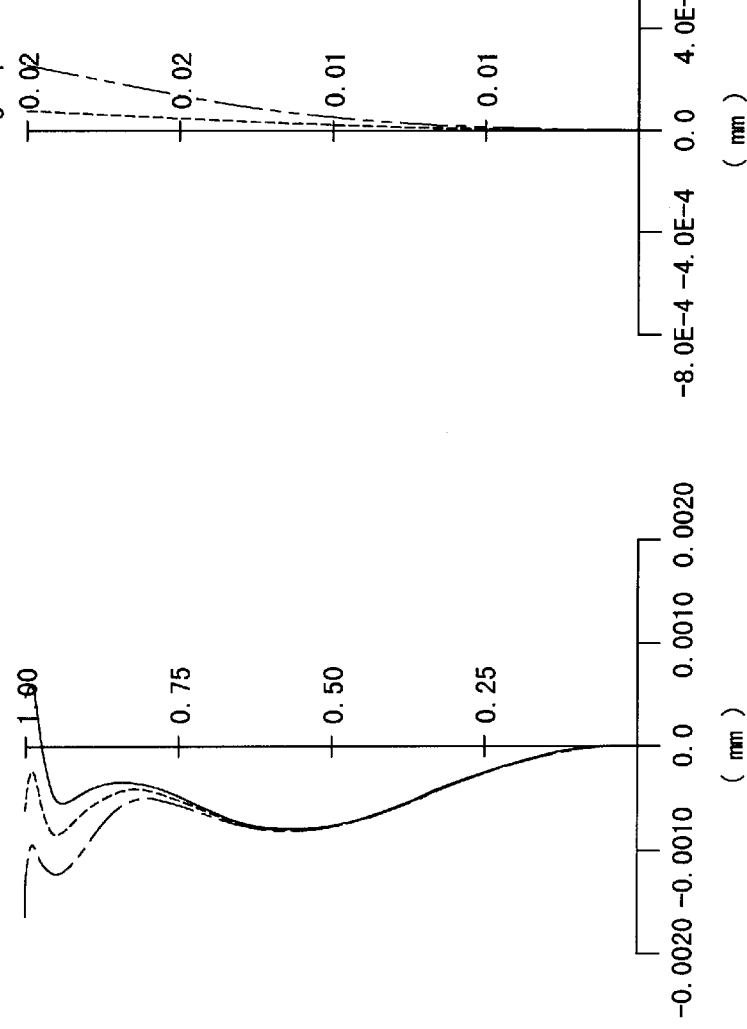
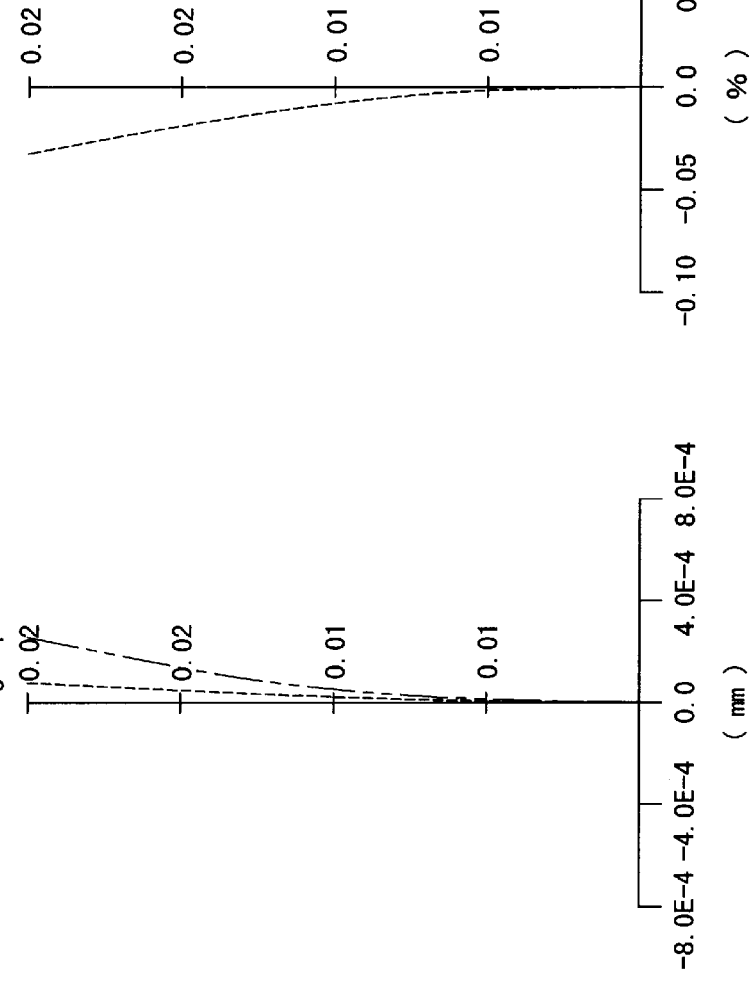
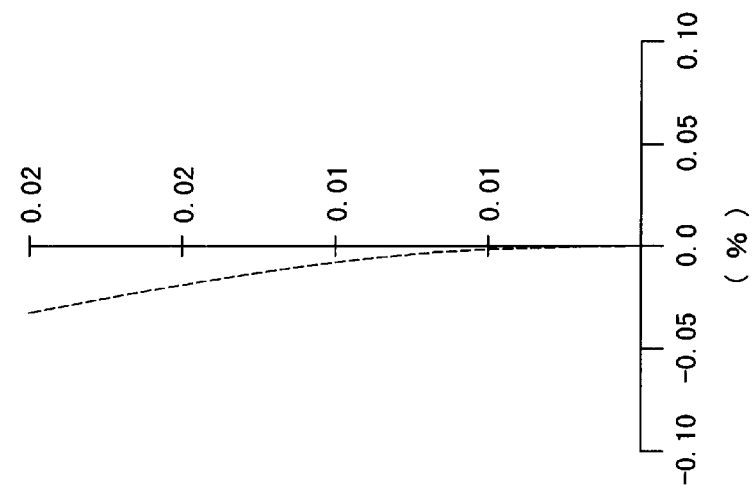

OBJECTIVE LENS

BACKGROUND OF THE INVENTION

1. Field of the Invention

This invention relates to an objective lens for optical apparatuses, and in particular, to an infinity-corrected objective lens which is suitable for a microscope using wavelengths of approximately 250 nm in a deep-ultraviolet region and has a high numerical aperture and a high magnification.

2. Description of Related Art

It is known that objective lenses for microscopes using wavelengths of approximately 250 nm in a deep-ultraviolet region are roughly divided into three types. The first type lens, as disclosed in each of Japanese Patent Preliminary Publication Nos. Hei 6-242381 and Hei 10-104510, is constructed with only a plurality of lenses made of the same medium (quartz in most cases) and cannot be in principle corrected for chromatic aberration. The second type lens, as disclosed in each of Japanese Patent Preliminary Publication Nos. Hei 5-72482, Hei 9-243923, and Hei 11-249025, is designed so that lenses made of different media (quartz and fluorite in most cases) are cemented with adhesives, and thereby chromatic aberration can be corrected. The third type lens, recently disclosed in Japenese Patent Preliminary Publication No. Hei 11-167067, is such that lenses made of quartz and fluorite are used to correct chromatic aberration, but they are not cemented with adhesives.

However, the first type lens, which cannot be in principle corrected for chromatic aberration, has the problem that when a light source with a wavelength width (such as a lamp or an excimer laser in which wavelengths are not in a narrow band) is used, light-collecting performance is considerably degraded due to chromatic aberration and thus predetermined resolution governed by the wavelength and the numerical aperture (NA) of the objective lens is not obtained. The second type lens, in which chromatic aberration can be corrected, has no such a problem. However, it has the problem that an adhesive for favorably transmitting deep-ultraviolet light is not virtually available, and even if it is available, difficulties about cementing force and workability are raised. It is common practice to render light, for example, from a lamp, incident on an objective lens, but if light with high energy, for example, from a laser, is rendered incident thereon, this causes the problem that the adhesive is deteriorated by the deep-ultraviolet light and the transmittance of the objective lens is reduced.

The third type lens is designed to solve all the problems encountered by the first and second type lenses. However, the lens discussed in Hei 11-167067 is basically related to an objective lens for laser repair using a deep-ultraviolet laser, and its embodiment discloses only an objective lens with a numerical aperture of 0.4. With this construction, the problem arises that it is quite impossible to reduce the wavelength so that high resolution can be obtained. Specifically, the resolution of a microscope is basically governed by the wavelength and the numerical aperture of the objective lens, but the central wavelength of visible light used in an ordinary microscope is nearly 550 nm and a dry objective lens has a maximum numerical aperture of about 0.9. Thus, if a wavelength used is set at approximately 250 nm, the wavelength is about halved and hence the resolution is approximately doubled. In this case, however, the numerical aperture is the same. In the objective lens with a numerical aperture of 0.4, even though the wavelength used is set at approximately 250 nm, the wavelength is about halved and the numerical aperture is also about halved. Thus, they are offset, and the result is that the resolution is exactly the same as in a conventional microscope.

SUMMARY OF THE INVENTION

It is, therefore, an object of the present invention to provide an objective lens which is favorably used in an optical apparatus employing wavelengths in deep-ultraviolet region and has a high numerical aperture so that chromatic aberration can be corrected by only combining single lenses of different media without using any cemented lens and resolution is dramatically improved to meet a fine design involved in a high density of a semiconductor and a large volume of an optical recording medium.

In order to achieve this object, the objective lens of the present invention includes a first lens unit constructed with a plurality of single lenses, having a negative power as a whole, and a second lens unit constructed with a plurality of single lenses, arranged on the object side of the first lens unit. Each of the first and second lens units is provided with air spaces between positive and negative lenses of different media and has at least one pair of lenses designed to satisfy all the following conditions when the parfocal distance of the objective lens is denoted by L (mm), an air apace by d (mm), the radius of curvature of a lens surface with a positive power opposite to the air space by Rp, and the radius of curvature of a lens surface with a negative power opposite to the air space by Rn, and in addition to the pair of lenses, the second lens unit has at least one single positive biconvex lens and at least one single positive meniscus lens, and thereby it becomes possible to correct chromatic aberration and to favorably obtain resolution corresponding to a high numerical aperture and a wavelength used:

$$0.01 < d \tag{1}$$

$$d/L < 0.01 \tag{2}$$

$$0.88 < Rp/Rn < 1.14 \tag{3}$$

In the objective lens mentioned above, the second lens unit has at least three pairs of lenses and is designed to satisfy the following condition, in addition to Conditions (1), (2), and (3), when the Abbe's number of each of positive lenses contained in these pairs of lenses is represented by ν dp and the Abbe's number of each of negative lenses contained in the pairs of lenses is represented by ν dn, and thereby the three pairs of lenses become equivalent to at least three cemented lenses so that aberrations including chromatic aberration can be favorably corrected:

$$\nu\, dp > \nu\, dn \tag{4}$$

Further, in the objective lens mentioned above, when the second lens unit is designed to have at least one lens configuration in which three adjacent lenses make two pairs of lenses, at least one false pair of lenses corresponding to a cemented triplet is obtained, and it becomes possible to correct chromatic aberration more favorably.

This and other objects as well as features and advantages of the present invention will become apparent from the following detailed description of the preferred embodiments when taken in conjunction with the accompanying drawings.

BRIEF DESCRIPTION OF THE DRAWINGS

FIGS. 2A, 2B, and 2C are diagrams showing aberration characteristics of the first embodiment;

FIGS. 4A, 4B, and 4C are diagrams showing aberration characteristics of the second embodiment;

DETAILED DESCRIPTION OF THE PREFERRED EMBODIMENTS

Figure 1:
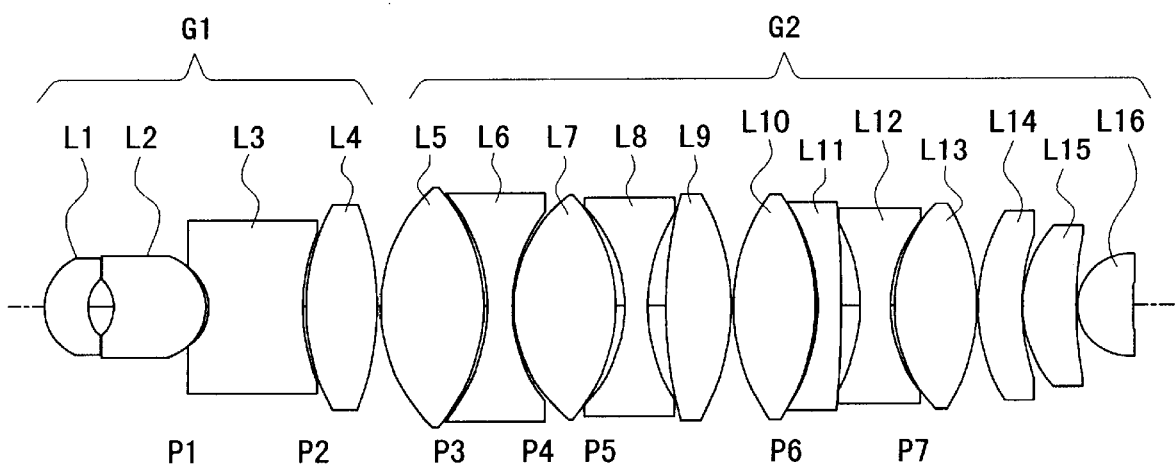
FIG. 1 is a view showing a lens arrangement of a first embodiment in the objective lens of the present invention.

The objective lens of the present invention, as mentioned above, is constructed with single lenses, without cementing lenses of different media with adhesives. According to the present invention, not only can chromatic aberration be corrected, but also the above problem produced in the case where the adhesive is used can be completely solved. Furthermore, for example, resolution fitted for wavelengths of approximately 250 nm in the deep-ultraviolet region and a high numerical aperture can be obtained, and thus the present invention is entirely favorable for an objective lens used in an optical apparatus such as an ultraviolet microscope.

However, if the objective lens fails to satisfy Condition (1) so that an air space between a pair of lenses is below 0.01, a lens space becomes extremely narrow and adjacent lenses will be nearly in contact. It is practically difficult to fabricate such a lens system. Condition (2) defines a condition for bringing lenses close to each other. If the value of this condition exceeds the upper limit of 0.01, the air space between the lenses becomes extremely wide and chromatic aberration cannot be favorably corrected. Condition (3) specifies a condition for nearly equalizing radii of curvature of opposite surfaces of a pair of lenses, and when the objective lens satisfies this condition, aberrations including chromatic aberration can be favorably corrected. However, if the limit of the condition is passed, correction for chromatic aberration becomes particularly difficult. From this, it may be said that Conditions (2) and (3) are conditions for allowing spherical aberration and chromatic aberration to be corrected by false behavior of lenses as in the case of a cemented lens even though an adhesive is not used.

Also, in Condition (2), the symbol L is defined as the parfocal distance of the objective lens. However, where the parfocal distance of the objective lens is nearly equal to the overall length of the objective lens, the overall length of the objective lens may be used as L. Here, the overall length of the objective lens refers to a distance from the first lens surface to the last lens surface.

In the present invention, the second lens unit may be designed to include at least three pairs of lenses. In this case, when the Abbe's number ν dp of the positive lens and the Abbe'number ν dn of the negative lens of each pair of lenses are set to satisfy the condition of ν dp>ν dn (Condition (4)), the three pairs of lenses become equivalent to at least three cemented lenses, and aberrations including chromatic aberration can be corrected more favorably. Condition (4) is related to the Abbe's numbers of the pair of lenses. Briefly described here is the reason why the relation between the Abbe's numbers of the positive and negative lenses is established as in Condition (4). In the present invention, the first lens unit and the second lens unit are different in behavior, so that in the first lens unit, monochromatic aberration is chiefly corrected, while in the second lens unit, axial chromatic aberration is principally corrected. Thus, in the second lens unit, by using a medium with low dispersion of a large Abbe's number for the positive lens and a medium with high dispersion of a small Abbe's number for the negative lens, chromatic aberration is effectively corrected. It the objective lens fails to satisfy Condition (4), axial chromatic aberration will be considerably produced and the chromatic aberration cannot be corrected as a whole.

In the present invention, the second lens unit may also be designed to include at least one lens configuration in which three lenses are brought close to one another. The three lenses in this case are arranged in the order of positive, negative, and positive lenses or negative, positive, and negative lenses. In this arrangement, two pairs of lenses are present and thus it may be said that chromatic aberration is corrected in each pair of lenses. However, from another viewpoint, the three lenses close to one another can be thought of as a cemented triplet. In this case, at least one pair of lenses corresponding to the cemented triplet will be provided, and chromatic aberration can be corrected as in the cemented triplet. In an ordinary objective lens, when the numerical aperture is relatively small, chromatic aberration can be corrected by using a cemented doublet. However, in an objective lens with a numerical aperture of 0.7 or more, notably of the order of 0.9, it becomes difficult to correct chromatic aberration with only the cemented doublet. Thus, even when the objective lens does not include any cemented lens as in the present invention, chromatic aberration can be favorably corrected by using a false cemented triplet such as that described above. In the present invention, the objective lens may be constructed so that the first lens unit has at least one lens with a positive power and at least one lens with a negative power, and the second lens unit has at least five biconvex lenses with positive powers and at least two meniscus lenses with positive powers. In doing so, monochromatic aberration can be favorably corrected in the main. In the objective lens with a numerical aperture of 0.7 or more, notably of the order of 0.9, even monochromatic aberration cannot be corrected unless the angle of a ray of light emanating from an object is reduced. However, when two meniscus lenses are used to gradually reduce the angle of the ray of light, correction for the aberration becomes possible. In the first lens unit in which a light beam is narrowed to some extent, it is required that a concave surface with a strong power is placed to restore a ray of light to parallel light and correct curvature of field and coma. In this case, if only a lens with a negative power is simply placed, the balance between aberrations will be lost. However, when at least one lens with a positive power and at least one lens with a negative power are placed, aberrations including chromatic aberration can be corrected, holding a good balance as a whole. The objective lens of the present invention can be constructed with lenses made of quartz and fluorite. In such a construction, an objective lens which is good in workability ability and durability and has a high transmittance can be obtained, as an objective lens for wavelengths of approximately 250 nm in a deep-ultraviolet region, even though media with deliquescence and birefringence are not used.

Four embodiments of the present invention will be explained below with reference to FIGS. 1–8C. Each of these embodiments cites an objective lens which has a focal length of 1.8 mm, a numerical aperture of 0.9 (0.95 in the second embodiment), a working distance of 0.3 mm (0.2 mm in the second embodiment), a parfocal length of 45 mm, and a compensating wavelength region of 248±1 nm. When this objective lens is combined with an imaging lens with a focal length of 180 mm, the values of a field number of 6 mm and a magnification of 100× are obtained. Since chromatic aberration is corrected within a limit of 248±1 nm, the objective lens can be used in combination with a KrF excimer laser in which wavelengths are not in a narrow band, and has sufficient durability in respect to a laser with high energy because the adhesive is not used. Furthermore, the objective lens is combined with a band-pass filter which has a half-width of about 2 nm, a specimen can be illuminated by a mercury lamp and observed at a stage before laser irradiation.

FIGS. 1, 3, 5, and 7 show lens arrangements of the embodiments in the present invention. In each of these figures, the right side indicates the object side, and individual lenses are represented by the reference symbols of L1–L8 in this order from the opposite side of the object side. Reference symbols G1 and G2 designate the first lens unit and the second lens unit, respectively, and P1–P7 designate pairs of lenses defined by the present invention. FIGS. 2A–2C, 4A–4C, 6A–6C, and 8A–8C show aberration characteristics of the embodiments, including spherical aberration, curvature of field, and distortion from the left side of the figure in each of the embodiments. Each of these aberrations is produced at the surface of the object where a ray is reversely traced through the objective lens and is expressed in millimeters or percentages. Spherical aberration is specified with respect to wavelengths of 248 nm indicated by a dotted line, 247 nm by a chain line, and 249 nm by a solid line.

First Embodiment

The lens arrangement of the first embodiment is shown in FIG. 1, and aberration characteristics are shown in FIGS. 2A–2C. As seen from FIG. 1, the first lens unit G1 of this embodiment is constructed with four lenses L1–L4 and includes two pairs of lenses P1 and P2. The second lens unit G2 is constructed with twelve lenses L5–L16 and includes five pairs of lenses P3–P7 so that three adjacent lenses L5–L7 make two pairs of lenses P3 and P4 to construct a false cemented triplet. Each of the pairs of lenses P3–P7 of the second lens unit G2 includes a lens with a negative power made of quartz (an Abbe's number of 68) and a lens with a positive power made of fluorite (an Abbe's of 95), and thus satisfies Condition (4). From Data 1 shown below, it is obvious that each of the pairs of lenses P1–P7 also satisfies Conditions (1)–(3). Numerical values used in Data 1 are expressed in millimeters, RDY represents the radius of curvature of each lens surface, and THI represents an air space along the optical axis between or the thickness of each lens. The same is said of Data 2, 3, and 4 described below.

Data 1

| Surface No. | RDY | THI | Medium | | Condition (2) | Condition (3) |
|---|---|---|---|---|---|---|
| 1 | INFINITY | −2.00 | | | | |
| 2 | 2.301 | 1.84 | SiO₂ | L1 | | |
| 3 | 1.690 | 1.10 | | | | |
| 4 | −1.961 | 4.00 | CaF₂ | L2 | P1 | 1.072 |
| 5 | −2.317 | 0.15 | | | 0.0034 | |
| 6 | −2.161 | 4.00 | SiO₂ | L3 | P2 | 0.894 |
| 7 | 7.967 | 0.14 | | | 0.0031 | |
| 8 | 8.910 | 3.07 | CaF₂ | L4 | | |
| 9 | −11.971 | 0.10 | | | | |
| 10 | 6.986 | 4.40 | CaF₂ | L5 | P3 | 1.059 |
| 11 | −7.440 | 0.15 | | | 0.0032 | |
| 12 | −7.027 | 1.00 | SiO₂ | L6 | P4 | 1.054 |
| 13 | 6.417 | 0.10 | | | 0.0022 | |
| 14 | 6.088 | 4.38 | CaF₂ | L7 | P5 | 1.112 |
| 15 | −6.966 | 0.23 | | | 0.0051 | |
| 16 | −6.263 | 1.00 | SiO₂ | L8 | | |
| 17 | 7.632 | 0.74 | | | | |
| 18 | 17.025 | 2.87 | CaF₂ | L9 | | |
| 19 | −9.501 | 0.10 | | | | |
| 20 | 8.406 | 3.50 | CaF₂ | L10 | P6 | 1.061 |
| 21 | −8.440 | 0.13 | | | 0.0028 | |
| 22 | −7.956 | 1.00 | SiO₂ | L11 | | |
| 23 | −47.024 | 0.78 | | | | |
| 24 | −8.228 | 1.29 | SiO₂ | L12 | P7 | 0.883 |
| 25 | 5.778 | 0.24 | | | 0.0052 | |
| 26 | 6.542 | 3.49 | CaF₂ | L13 | | |
| 27 | −7.677 | 0.10 | | | | |
| 28 | 7.584 | 1.92 | CaF₂ | L14 | | |
| 29 | 13.739 | 0.12 | | | | |
| 30 | 4.947 | 2.31 | CaF₂ | L15 | | |
| 31 | 14.800 | 0.10 | | | | |
| 32 | 2.196 | 2.32 | SiO₂ | L16 | | |
| 33 | 17.211 | 0.36 | | | | |
| 34 | INFINITY | | | | | |

Second Embodiment

Figure 3:
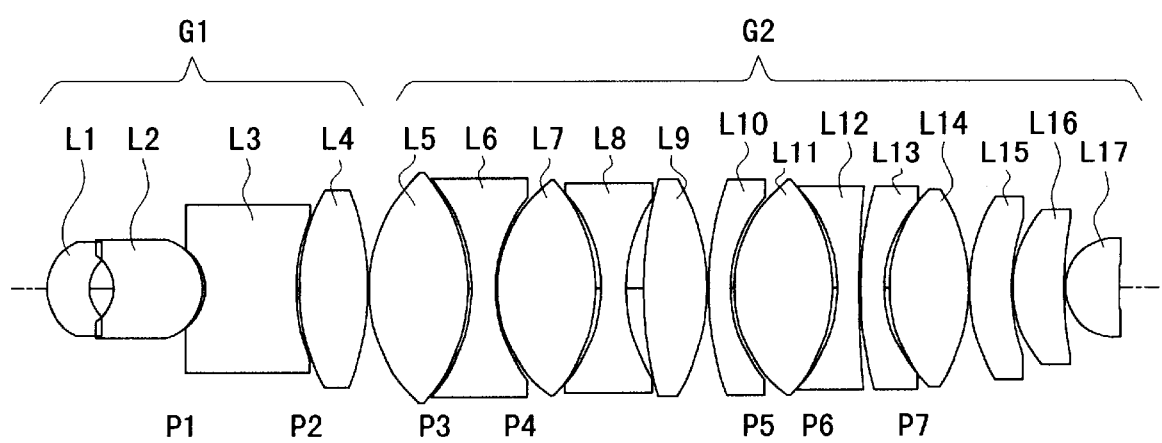
FIG. 3 is a view showing a lens arrangement of a second embodiment in the objective lens of the present invention.

The lens arrangement of the second embodiment is shown in FIG. 3, and aberration characteristics are shown in FIGS. 4A–4C. As seen from FIG. 3, the first lens unit G1 of this embodiment is also constructed with four lenses L1–L4 and includes two pairs of lenses P1 and P2. The second lens unit G2 is constructed with thirteen lenses L5–L17 and includes five pairs of lenses P3–P7. In the second embodiment, the second lens unit G2 has two false cemented triplets, one in which three lenses L5–L7 make two pairs of lenses P3 and P4 and the other in which three lenses L10–L12 make two pairs of lenses P5 and P6. Each of the pairs of lenses P3–P7 of the second lens unit G2 includes a lens with a negative power made of quartz (an Abbe's number of 68) and a lens with a positive power made of fluorite (an Abbe's number of 95), and thus satisfies Condition (4). From Data 2 shown below, it is obvious that each of the pairs of lenses P1–P7 also satisfies Conditions (1)–(3).

Data 2

| Surface No. | RDY | THI | Medium | | Condition (2) | Condition (3) |
|---|---|---|---|---|---|---|
| 1 | INFINITY | −2.00 | | | | |
| 2 | 2.770 | 2.66 | SiO₂ | L1 | | |
| 3 | 1.629 | 0.83 | | | | |
| 4 | −2.356 | 3.86 | CaF₂ | L2 | P1 | 1.102 |
| 5 | −2.468 | 0.22 | | | 0.0050 | |
| 6 | −2.239 | 3.43 | SiO₂ | L3 | P2 | 0.902 |
| 7 | 8.035 | 0.13 | | | 0.0028 | |
| 8 | 8.913 | 2.71 | CaF₂ | L4 | | |
| 9 | −9.537 | 0.10 | | | | |
| 10 | 7.113 | 4.06 | CaF₂ | L5 | P3 | 1.046 |

-continued

Data 2

| Surface No. | RDY | THI | Medium | | Condition (2) | Condition (3) |
|---|---|---|---|---|---|---|
| 11 | −7.107 | 0.13 | | | 0.0029 | |
| 12 | −6.794 | 1.00 | SiO$_2$ | L6 P4 | | 1.081 |
| 13 | 6.496 | 0.10 | | | 0.0022 | |
| 14 | 6.009 | 4.18 | CaF$_2$ | L7 | | |
| 15 | −7.173 | 0.24 | | | | |
| 16 | −6.373 | 1.00 | SiO$_2$ | L8 | | |
| 17 | 7.655 | 0.78 | | | | |
| 18 | 20.340 | 2.63 | CaF$_2$ | L9 | | |
| 19 | −10.529 | 0.10 | | | | |
| 20 | 17.247 | 1.00 | SiO$_2$ | L10 P5 | | 1.028 |
| 21 | 6.454 | 0.16 | | | 0.0035 | |
| 22 | 6.278 | 4.28 | CaF$_2$ | L11 P6 | | 1.111 |
| 23 | −7.383 | 0.23 | | | 0.0050 | |
| 24 | −6.647 | 1.00 | SiO$_2$ | L12 | | |
| 25 | 42.369 | 0.10 | | | | |
| 26 | 15.694 | 1.00 | SiO$_2$ | L13 P7 | | 0.887 |
| 27 | 5.630 | 0.28 | | | 0.0062 | |
| 28 | 6.346 | 3.68 | CaF$_2$ | L14 | | |
| 29 | −9.541 | 0.10 | | | | |
| 30 | 7.431 | 1.99 | CaF$_2$ | L15 | | |
| 31 | 14.337 | 0.10 | | | | |
| 32 | 4.637 | 2.15 | CaF$_2$ | L16 | | |
| 33 | 8.464 | 0.10 | | | | |
| 34 | 2.121 | 2.40 | SiO$_2$ | L17 | | |
| 35 | 17.791 | 0.27 | | | | |
| 36 | INFINITY | | | | | |

Third Embodiment

Figure 5:
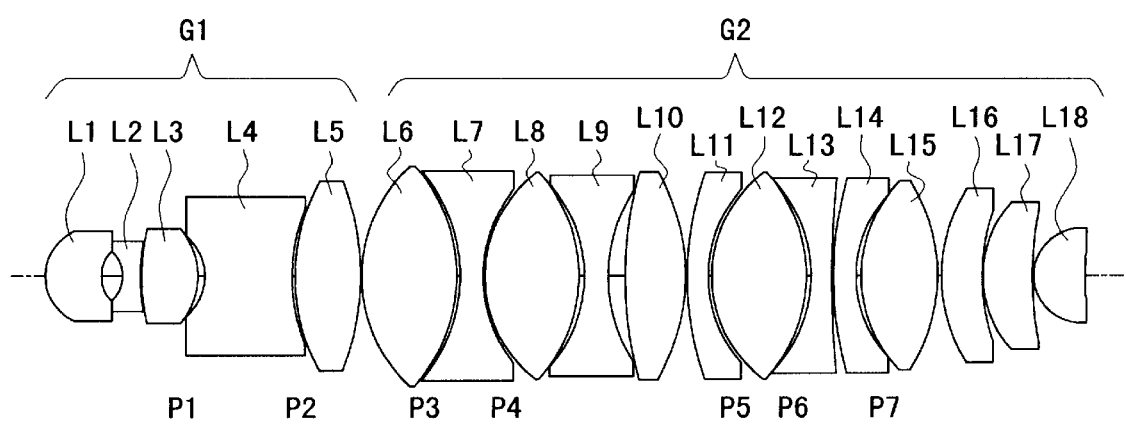
FIG. 5 is a view showing a lens arrangement of a third embodiment in the objective lens of the present invention.
Figure 6C:
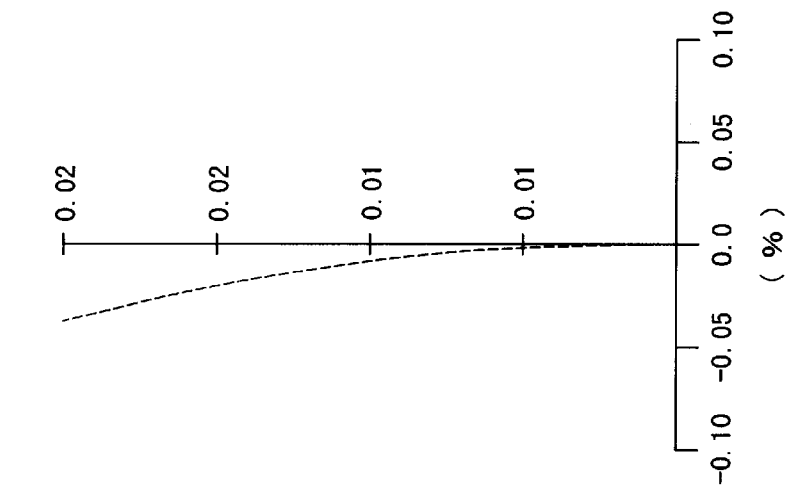
FIGS. 6A, 6B, and 6C are diagrams showing aberration characteristics of the third embodiment.
Figure 6B:
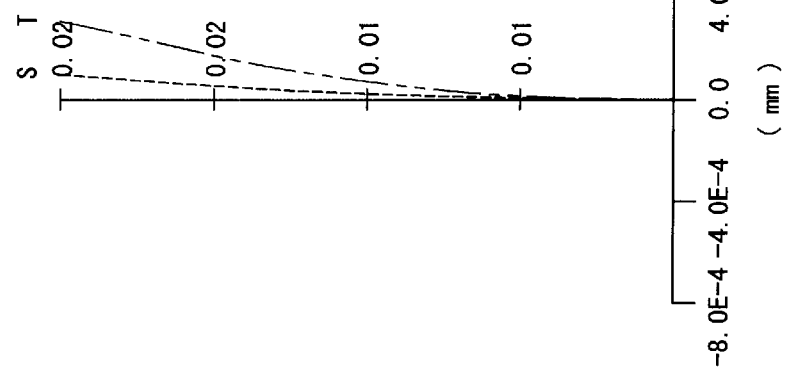
Figure 6A:
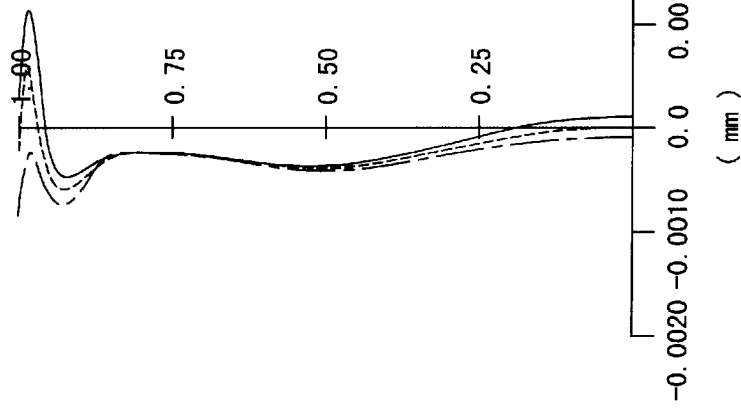

The lens arrangement of the third embodiment is shown in FIG. 5, and aberration characteristics are shown in FIGS. 6A–6C. As seen from FIG. 5, the first lens unit G1 of this embodiment is constructed with five lenses L1–L5 and includes two pairs of lenses P1 and P2. The second lens unit G2 is constructed with thirteen lenses L6–L18 and includes five pairs of lenses P3–P7. In the third embodiment, the second lens unit G2 has two false cemented triplets, one in which three lenses L6–L8 make two pairs of lenses P3 and P4 and the other in which three lenses L1–L13 make two pairs of lenses P5 and P6. Each of the pairs of lenses P3–P7 of the second lens unit G2 includes a lens with a negative power made of quartz (an Abbe's number of 68) and a lens with a positive power made of fluorite (an Abbe's number of 95), and thus satisfies Condition (4). From Data 3 shown below, it is obvious that each of the pairs of lenses P1–P7 also satisfies Conditions (1)–(3).

Data 3

| Surface No. | RDY | THI | Medium | | Condition (2) | Condition (3) |
|---|---|---|---|---|---|---|
| 1 | INFINITY | −2.00 | | | | |
| 2 | 2.759 | 2.71 | SiO$_2$ | L1 | | |
| 3 | 1.589 | 0.77 | | | | |
| 4 | −2.394 | 1.00 | CaF$_2$ | L2 P1 | | 0.900 |
| 5 | 9.405 | 0.10 | | | 0.0023 | |
| 6 | 10.449 | 2.64 | SiO$_2$ | L3 | | |
| 7 | −3.158 | 0.28 | | | | |
| 8 | −2.461 | 4.00 | SiO$_2$ | L4 P2 | | 0.907 |
| 9 | 8.164 | 0.13 | | | 0.0028 | |
| 10 | 9.001 | 2.75 | CaF$_2$ | L5 | | |
| 11 | −9.396 | 0.10 | | | | |
| 12 | 7.150 | 4.21 | CaF$_2$ | L6 P3 | | 1.052 |
| 13 | −6.905 | 0.13 | | | 0.0032 | |

-continued

Data 3

| Surface No. | RDY | THI | Medium | | Condition (2) | Condition (3) |
|---|---|---|---|---|---|---|
| 14 | −6.565 | 1.00 | SiO$_2$ | L7 P4 | | 1.087 |
| 15 | 6.486 | 0.10 | | | 0.0022 | |
| 16 | 5.969 | 4.23 | CaF$_2$ | L8 | | |
| 17 | −7.004 | 0.24 | | | | |
| 18 | −6.222 | 1.00 | SiO$_2$ | L9 | | |
| 19 | 7.878 | 0.59 | | | | |
| 20 | 14.805 | 2.75 | CaF$_2$ | L10 | | |
| 21 | −10.249 | 0.10 | | | | |
| 22 | 26.379 | 1.00 | SiO$_2$ | L11 P5 | | 1.032 |
| 23 | 6.142 | 0.10 | | | 0.0022 | |
| 24 | 5.951 | 4.08 | CaF$_2$ | L12 P6 | | 1.101 |
| 25 | −6.965 | 0.20 | | | 0.0045 | |
| 26 | −6.326 | 1.00 | SiO$_2$ | L13 | | |
| 27 | 1827.930 | 0.10 | | | | |
| 28 | 24.702 | 1.00 | SiO$_2$ | L14 P7 | | 0.892 |
| 29 | 5.203 | 0.25 | | | 0.0057 | |
| 30 | 5.834 | 3.36 | CaF$_2$ | L15 | | |
| 31 | −10.631 | 0.10 | | | | |
| 32 | 6.836 | 1.97 | CaF$_2$ | L16 | | |
| 33 | 13.351 | 0.10 | | | | |
| 34 | 4.310 | 2.11 | CaF$_2$ | L17 | | |
| 35 | 7.294 | 0.10 | | | | |
| 36 | 2.177 | 2.32 | SiO$_2$ | L18 | | |
| 37 | 18.560 | 0.36 | | | | |
| 38 | INFINITY | | | | | |

Fourth Embodiment

Figure 7:
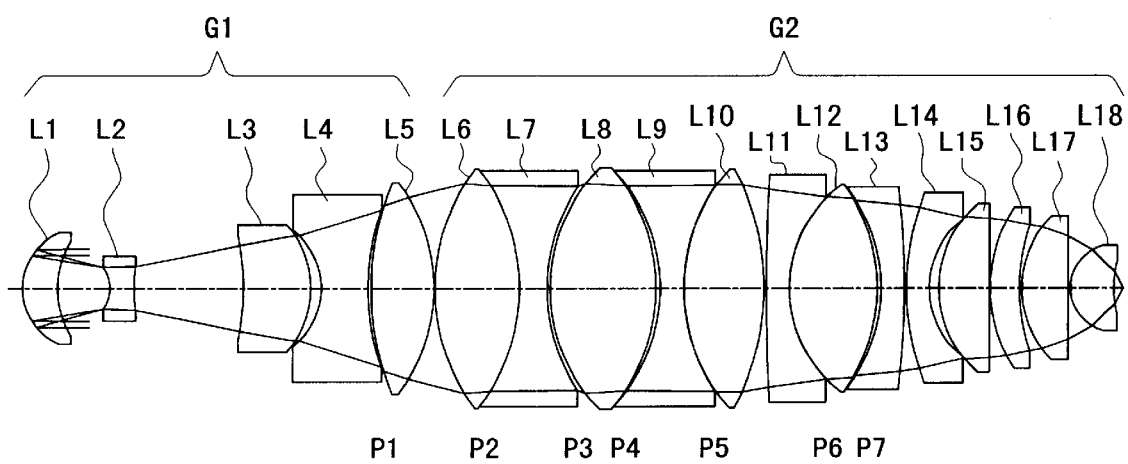
FIG. 7 is a view showing a lens arrangement of a fourth embodiment in the objective lens of the present invention.
Figure 8C:
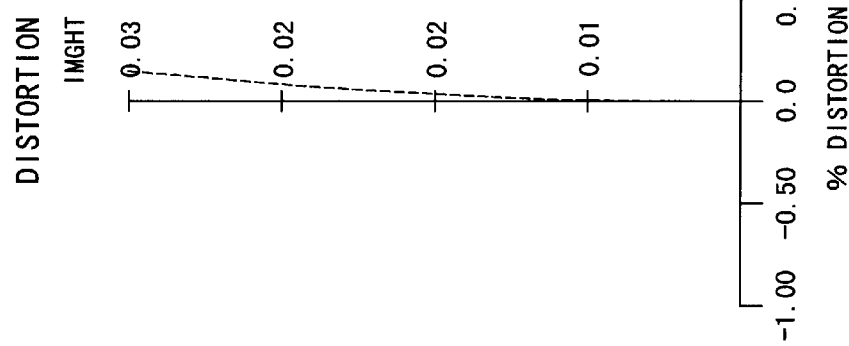
FIGS. 8A, 8B, and 8C are diagrams showing aberration characteristics of the fourth embodiment.
Figure 8B:
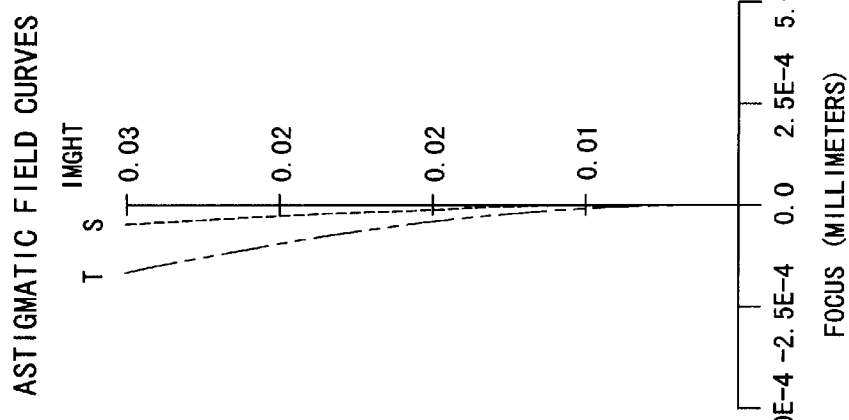
Figure 8A:
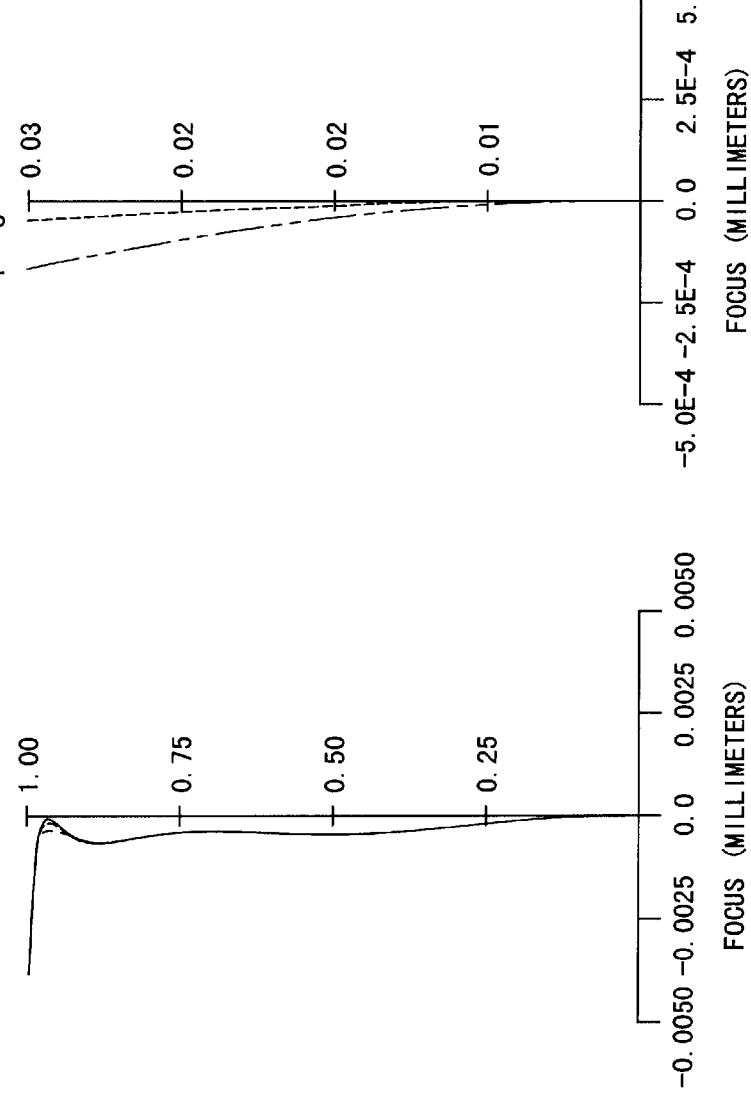

The lens arrangement of the fourth embodiment is shown in FIG. 7, and aberration characteristics are shown in FIGS. 8A–8C. As seen from FIG. 7, the first lens unit G1 of this embodiment is constructed with five lenses L1–L5 and includes one pair of lenses P1. The second lens unit G2 is constructed with thirteen lenses L6–L18 and includes six pairs of lenses P2–P7 so that five adjacent lenses L6–L10 make four pairs of lenses P2–P5 to construct false cemented triplets. Each of the pairs of lenses P2–P7 of the second lens unit G2 includes a lens with a negative power made of quartz (an Abbe's number of 68) and a lens with a positive power made of fluorite (an Abbe's number of 95), and thus satisfies Condition (4). From Data 4 shown below, it is obvious that each of the pairs of lenses P1–P7 also satisfies Conditions (1)–(3).

Data 4

| Surface No. | RDY | THI | Medium | | Condition (2) | Condition (3) |
|---|---|---|---|---|---|---|
| 1 | INFINITY | −3.00 | | | | |
| 2 | 2.420 | 1.54 | SiO$_2$ | L1 | | |
| 3 | 3.508 | 2.30 | | | | |
| 4 | −1.737 | 1.00 | SiO$_2$ | L2 | | |
| 5 | 6.392 | 4.86 | | | | |
| 6 | −12.159 | 2.95 | SiO$_2$ | L3 | | |
| 7 | −3.813 | 0.47 | | | | |
| 8 | −2.801 | 2.07 | SiO$_2$ | L4 P1 | | 0.905 |
| 9 | 10.872 | 0.13 | | | 0.0028 | |
| 10 | 12.018 | 2.60 | CaF$_2$ | L5 | | |
| 11 | −7.384 | 0.10 | | | | |
| 12 | 7.985 | 3.77 | CaF$_2$ | L6 P2 | | 1.092 |
| 13 | −7.801 | 0.21 | | | 0.0048 | |
| 14 | −7.144 | 1.00 | SiO$_2$ | L7 P3 | | 1.116 |
| 15 | 7.808 | 0.10 | | | 0.0022 | |
| 16 | 6.993 | 4.60 | CaF$_2$ | L8 P4 | | 1.083 |

-continued

Data 4

| Surface No. | RDY | THI | Medium | | | Condition (2) | Condition (3) |
|---|---|---|---|---|---|---|---|
| 17 | −7.658 | 0.20 | | | | 0.0045 | |
| 18 | −7.072 | 1.00 | SiO$_2$ | L9 | P5 | | 0.978 |
| 19 | 7.442 | 0.10 | | | | 0.0023 | |
| 20 | 7.609 | 3.46 | CaF$_2$ | L10 | | | |
| 21 | −10.351 | 0.10 | | | | | |
| 22 | 86.624 | 1.00 | SiO$_2$ | L11 | P6 | | 0.984 |
| 23 | 5.399 | 0.10 | | | | 0.0022 | |
| 24 | 5.485 | 3.68 | CaF$_2$ | L12 | P7 | | 1.086 |
| 25 | −7.392 | 0.16 | | | | 0.0036 | |
| 26 | −6.807 | 1.00 | SiO$_2$ | L13 | | | |
| 27 | −33.377 | 0.10 | | | | | |
| 28 | 11.127 | 1.00 | SiO$_2$ | L14 | | | |
| 29 | 3.838 | 0.40 | | | | | |
| 30 | 4.601 | 2.15 | CaF$_2$ | L15 | | | |
| 31 | INFINITY | 0.10 | | | | | |
| 32 | 7.016 | 1.20 | SiO$_2$ | L16 | | | |
| 33 | 8.681 | 0.10 | | | | | |
| 34 | 4.266 | 1.99 | CaF$_2$ | L17 | | | |
| 35 | INFINITY | 0.10 | | | | | |
| 36 | 1.790 | 1.94 | SiO$_2$ | L18 | | | |
| 37 | 6.024 | 0.40 | | | | | |
| 38 | INFINITY | | | | | | |

What is claimed is:

1. An objective lens comprising:

a first lens unit constructed with a plurality of single lenses, having a negative power as a whole; and a second lens unit constructed with a plurality of single lenses, arranged on an object side of said first lens unit, wherein each of said first lens unit and said second lens unit is provided with air spaces between positive and negative lenses of different media and has at least one pair of lenses designed to satisfy the following conditions, and in addition to said pair of lenses, said second lens unit has at least one single positive biconvex lens and at least one single positive meniscus lens:

$0.01 < d$ $d/L < 0.01$ $0.88 < Rp/Rn < 1.14$ where L is a parfocal distance of said objective lens in millimeters, d is an air apace in millimeters, Rp is a radius of curvature of a lens surface with a positive power opposite to the air space, and Rn is a radius of curvature of a lens surface with a negative power opposite to the air space, and wherein said second lens unit has at least three pairs of lenses and satisfies the following condition:

$\nu\, dp > \nu\, dn$ where ν dp is an Abbe's number of each of positive lenses contained in said pairs of lenses and ν dn is an Abbe's number of each of negative lenses contained in said pairs of lenses.

2. An objective lens according to claim 1, having at least one lens configuration in which three adjacent lenses make two pairs of lenses.

3. An objective lens according to claim 2, wherein said first lens unit has at least one lens with a positive power and at least one lens with a negative power, and the second lens unit has at least five biconvex lenses with positive powers and at least two meniscus lenses with positive powers.

4. An objective lens according to claim 2, wherein said objective lens is constructed of quartz and fluorite.

5. An objective lens comprising:

a first lens unit comprising a plurality of single lenses, having a negative power as a whole; and a second lens unit comprising a plurality of single lenses, arranged on an object side of said first lens unit, wherein each of said first lens unit and said second lens unit is provided with air spaces between positive and negative lenses of different media and has at least one pair of lenses designed to satisfy the following conditions, and in addition to said pair of lenses, said second lens unit has at least one single positive biconvex lens and at least one single positive maniscus lens:

$0.01 < d$ $d/L < 0.01$ $0.88 < Rp/Rn < 1.14$ where L is a parfocal distance of said objective lens in millimeters, d is an air space in millimeters, Rp is a radius of curvature of a lens surface with a positive power opposite to the air space, and Rn is a radius of curvature of a lens surface with a negative power opposite to the air space, and wherein said objective lens has at least one lens configuration in which three adjacent lenses make two pairs of lenses.

6. An objective lens according to claim 5, wherein said first lens unit has at least one lens with a positive power and at least one lens with a negative power, and said second lens unit has at least five biconvex lenses with positive powers at least two maniscus lenses with positive powers.

7. An objective lens according to claim 5, wherein said objective lens is constructed of quartz and fluorite.

* * * * *